United States Patent [19]
Gifford

[11] Patent Number: 5,375,861
[45] Date of Patent: Dec. 27, 1994

[54] NO-HANDS BABY STROLLER

[76] Inventor: Henry Gifford, 230 Riverside Dr. #11C, New York, N.Y. 10025-6172

[21] Appl. No.: 40,137

[22] Filed: Mar. 30, 1993

[51] Int. Cl.⁵ .......................... B62B 9/00; B62B 9/08
[52] U.S. Cl. .................................. 280/47.38; 280/62; 280/1.5; 482/74
[58] Field of Search ................... 280/1.5, 47.25, 47.38, 280/62, 33.994, 480, 484, 288.4, 293, DIG. 6, DIG. 11; 180/19, 216; 482/66, 67, 68, 69, 74

[56] References Cited

U.S. PATENT DOCUMENTS

| | | |
|---|---|---|
| D. 204,254 | 4/1966 | Cerf . |
| D. 239,523 | 4/1976 | Firth et al. . |
| D. 274,714 | 7/1984 | Cone . |
| D. 297,525 | 9/1988 | Baechler . |
| 493,676 | 3/1893 | Bobo .................................. 188/19 |
| 699,186 | 5/1902 | Katzke . |
| 1,985,468 | 12/1934 | Strang ................................ 280/480 |
| 2,209,098 | 7/1940 | Carsten ............................ 280/47.38 |
| 2,727,581 | 12/1955 | Wright ............................... 280/480 |
| 2,854,241 | 9/1958 | Dobrowolski . |
| 3,781,031 | 12/1973 | Patin . |
| 3,912,032 | 10/1975 | Benz et al. . |
| 4,018,449 | 4/1977 | Anderson ......................... 188/19 X |
| 4,116,464 | 9/1978 | Haley ....................... 280/33.994 X |
| 4,346,912 | 8/1982 | Habib . |
| 4,360,213 | 11/1982 | Rudwick et al. . |
| 4,618,184 | 10/1986 | Harvey . |
| 4,757,868 | 7/1988 | Cresswell . |
| 4,953,880 | 9/1990 | Sudakoff et al. . |
| 5,062,651 | 11/1991 | Varieur ............................... 280/1.5 |
| 5,090,517 | 2/1992 | Doughty .............................. 188/19 |
| 5,106,108 | 4/1992 | Howell ............................... 280/1.5 |
| 5,265,891 | 11/1993 | Diehl .................................. 280/1.5 |

OTHER PUBLICATIONS

Brochure for "Run About" products from UNI-USA, date unknown.
Pamphlet entitled "Happy Miles!" for Baby Jogger, Walkabout and Twinner products from Racing Strollers, Inc., date unknown.
Flyer for "The Baby Jogger", Walkabout and Twinner products from Mary Fanelli Lund, date unknown.
Flyer for "Easy Strider" product from Huffy, Aug. 1991.

*Primary Examiner*—Brian L. Johnson
*Attorney, Agent, or Firm*—Brumbaugh, Graves, Donohue & Raymond

[57] ABSTRACT

An improved stroller allows a runner to bring a baby along while running. The improvement comprises an elongate connector which flexes near each end and is rigid in the middle. One end of the connector is attached to the stroller and the other to the user, thus eliminating the need for the runner to use his or her hands to control the stroller. This allows the runner to freely swing his or her arms in a natural running motion.

16 Claims, 4 Drawing Sheets

NO-HANDS BABY STROLLER

BACKGROUND OF THE INVENTION

The invention relates generally to baby strollers, and more particularly to baby strollers that are used to bring a baby along while running.

It has become commonplace for persons to use wheeled devices to bring a child along while running. These wheeled devices are referred to as "Baby Joggers", running strollers, and other names. They are distinguished by their large wheels (typically three) and other features intended to make then more suited to running than normal baby carriages or strollers.

One disadvantage common to the presently popular devices is the need to use a hand or hands to control the device by holding the handle while running. This activity is difficult and cumbersome because the inability to swing one's arm while running costs the body the use of that arm as a counterbalance. The resulting unbalanced running action is difficult, uncomfortable, no fun, and potentially injurious. Thus there is the need for a baby stroller that can be used while running without requiring the use of the upper limb(s) for control.

SUMMARY OF THE INVENTION

In accordance with the present invention, a baby stroller is connected to the adult user by means of a flexible member that permits the natural up and down body movements and swinging arm movements of running to take place uninhibited while retaining a connection to accomplish control of the stroller.

BRIEF DESCRIPTION OF THE DRAWINGS

The invention will be shown and described with reference to drawings, of which:

FIG. 6 is a schematic illustration of an embodiment of the rigid portion of the flexible connector in which the running user's fore and aft displacement relative to the stroller is compensated for.

DETAILED DESCRIPTION

Figure 1:
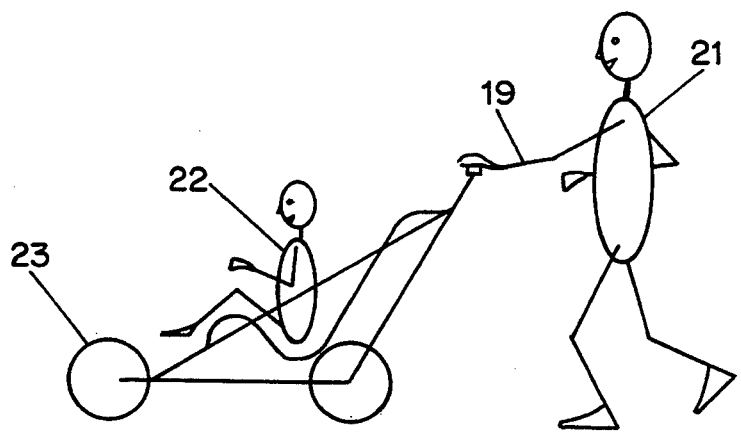
FIG. 1 is a schematic illustration of a prior art baby stroller in use.

FIG. 1 is a schematic illustration of the prior art in use. The person on the right 21 is running while the baby 22 is in the prior art stroller 23 at left. The runner 21 is holding the stroller 23 with an outstretched arm/hand 19 to effect control of the stroller's direction and speed of travel.

Figure 2:
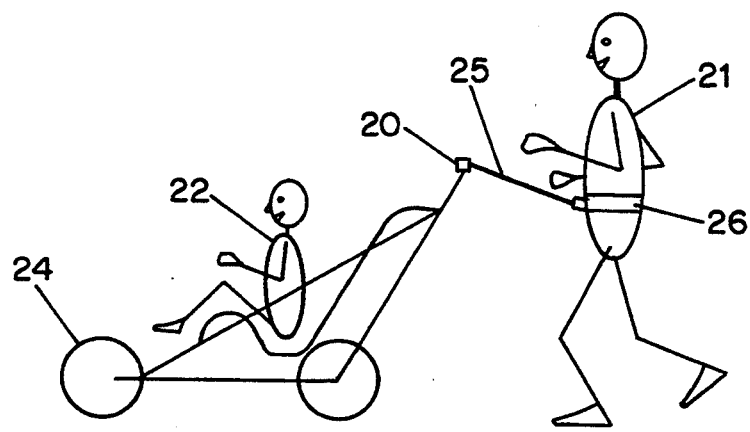
FIG. 2 is a schematic illustration of the present invention in use while the running user is in a downward movement.
Figure 3:
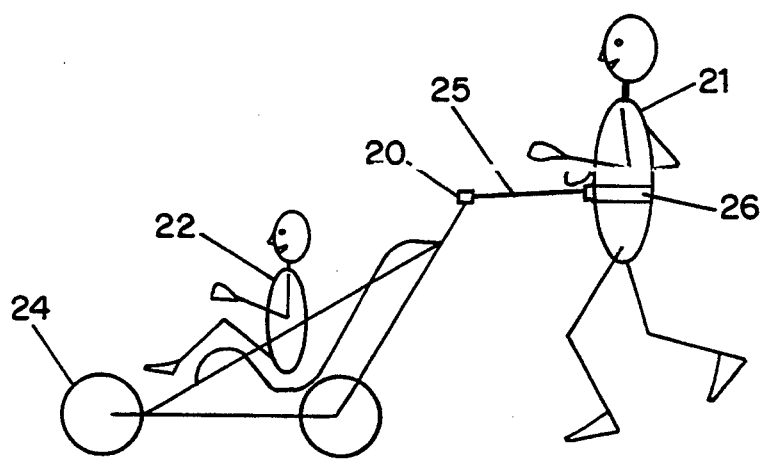
FIG. 3 is a schematic illustration of the present invention in use while the running user is in an upward movement.

FIGS. 2 and 3 are schematic illustrations of the invention in use. The diagrams show the running user 21 on the right, and the no-hands running stroller 24 containing the baby 22 at the left. Although a typical baby stroller has three or four wheels, the stroller of the present invention may have only two wheels in a rickshaw-type arrangement (not pictured). The diagrams also show a flexible connector 25 connecting the upper handle portion 20 of the stroller 24 with a belt 26 on the runner's waist. The belt 26 is one possible method of attaching the flexible connector 25 to the runner's body. Other methods include hip or shoulder attachments. Note that the runner 21 is free to run without using hand control of the stroller 24, thus enjoying a much more natural running motion.

The runner 21 is travelling from the right of FIGS. 2 and 3 to left of FIGS. 2 and 3 while also moving in an up and down, or vertical, fashion as is normal during running. The runner 21 is shown at the lower end of the vertical motion in FIG. 2, and at the upper end of the vertical motion in FIG. 3. Thus it is shown that the connecting member 25 is flexible in the vertical direction so as to permit the natural up and down body movement of running while the stroller 24 moves horizontally. The handle 20 of prior art strollers is retained for use if desired, but such use is rendered unnecessary by this invention.

Figure 4:
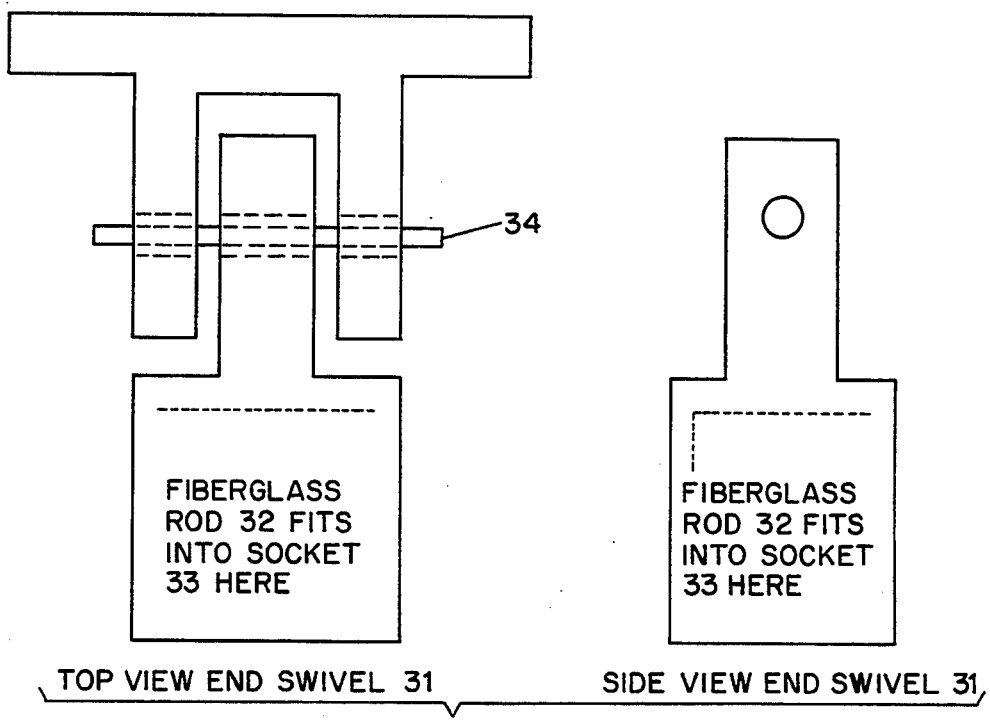
FIG. 4 is a schematic illustration of one of the end swivels.
Figure 5:
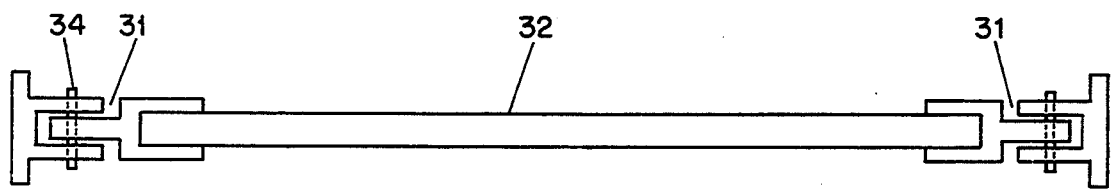
FIG. 5 is a schematic illustration of the assembled flexible connector.

FIG. 4 shows the detail of the end swivels 31 of the flexible connector 25 used in one possible embodiment. The rotation around swivel pin 34 permits flexing in one plane only, while the structure of the swivel prevents flexing in other planes. The assembled flexible connector 25, including the end swivels 31, is shown in FIG. 5. One end swivel 31 is employed at each end of flexible connector 25. In this embodiment, the middle section consists of a fiberglass rod 32 measuring ¼" diameter and 14" long, each end of the rod 32 being secured by epoxy adhesive into socket 33 in each end swivel 31. The rod 32 is fashioned so as to permit little or no longitudinal stretching or compressive buckling or lateral flexing under normal usage conditions.

Those skilled in the art will appreciate that, in other embodiments, the rod 32 may be made from another rigid material such as plastic or wood. Also, the length of the flexible connector 25 may vary from about six inches to about four feet, this range being governed by the possible arm lengths of runners.

In another embodiment of the present invention, the flexible connector 25, in addition to providing vertical flexibility, also provides flexibility in the fore and aft directions. This feature is intended to increase the comfort of the invention by accommodating fore and aft movement of the runner relative to the stroller, as a person running does not move forward in perfectly linear fashion.

Figure 6:
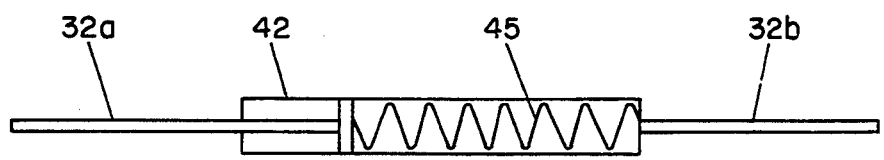

FIG. 6 illustrates the preferred structure for implementing this flexing feature which is essentially an addition to the rod portion 32 of the flexible connector of FIG. 5, the addition being a spring 45 arranged within a cylindrical housing 42 in a fashion similar to an automotive shock absorber or a spring door closer. The rod portion 32 of the connector 25 of this embodiment is divided into two sections 32a and 32b between which the shock absorber is disposed. The spring 45 remains in a non-flexed state when the runner is not applying any force to the connector 25. As the runner applies a force in the direction of the length of the connector 25, the spring 45 will flex, either compressing or elongating, to accommodate the force, resulting in a smoother ride for both the baby and the runner.

In FIGS. 2 and 3, one end of the flexible connector 25 is attached to belt 26 which is connected to the body of the user 21. Various other means of connecting the flexible connector to the body can be employed without departing from the scope of the invention. The means of attachment of the flexible connector to the belt can be sewing, gluing, riveting, or any other suitable method of attachment without departing from the spirit of this embodiment.

The other end of flexible connector 25 is attached to the no-hands stroller 24. The swivels 31 are oriented so as to permit up and down flexibility while maintaining stiffness from side to side. This stiffness gives the runner 21 steering control of the no-hands stroller 24 while the vertical flexibility permits the natural up and down motion of running.

In the embodiment depicted in FIGS. 2 and 3, the left end (left in FIGS. 2 and 3) of flexible connector 25 is attached to the no-hands stroller 24 by use of a pair of magnets 35 that permit disconnection when enough force is applied. This is a safety feature intended to prevent injury to user 21 or baby 22 in the event of an accident such as user 21 falling. It will be appreciated by persons skilled in the art that other mechanisms such as spring clips, latches, breakable material and the like can De employed to achieve essentially the same results without departing from the scope of the invention.

Figure 7:
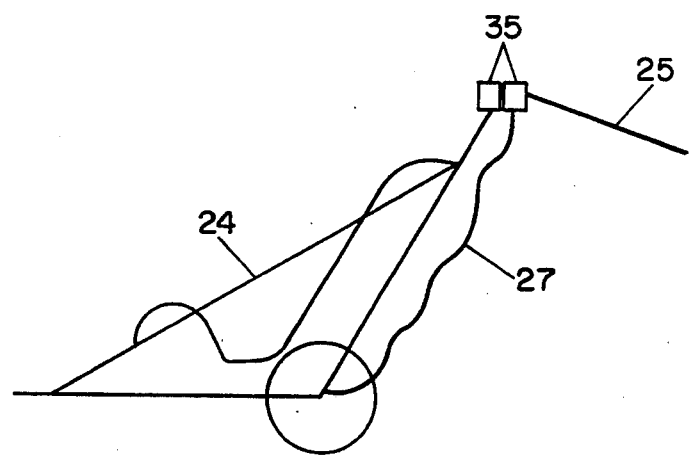
FIG. 7 is a schematic illustration of a first embodiment of the cable used for control in the event of the running user falling.
Figure 7A:
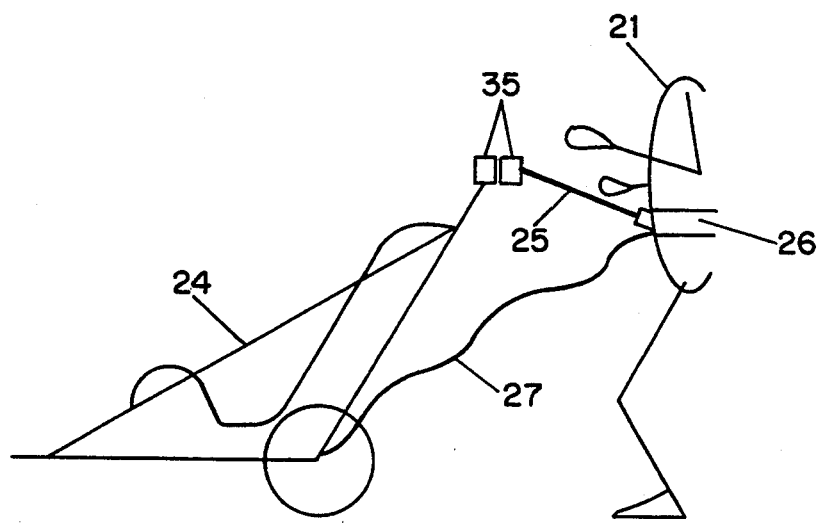
FIG. 7A is a schematic illustration of a second embodiment of the cable used for control in the event of the running user falling.

FIG. 7 shows a cable 27 connected from the stroller end of the flexible connector 25 to the rear lower portion of the no-hands stroller 24 to prevent complete loss of control of the stroller 24 in the event of disconnection of the flexible connector. Alternatively, the cable could be connected to the runner 21 rather than the stroller end of the flexible connector 25 to provide the same safety feature. The cable 27 could be steel cable, nylon rope, chain, or any other suitable material.

Figure 8:
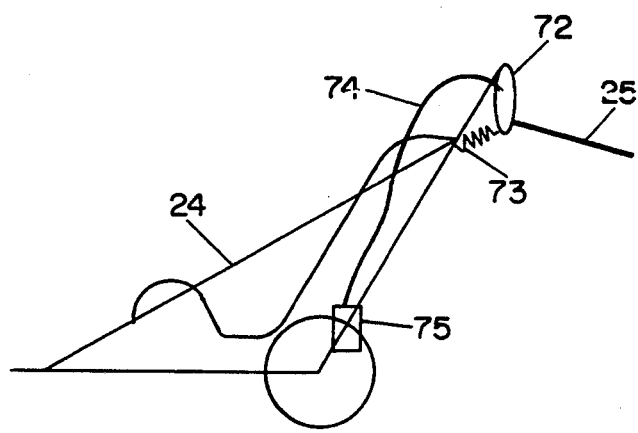
FIG. 8 is a schematic illustration of the brake mechanism used to increase the user's control over the device.

The no-hands stroller 24 can also be equipped with an automatic braking mechanism arranged to apply braking action whenever gravity tends to pull the no-hands stroller downhill faster than the person running 21 is running. FIG. 8 shows one possible brake and spring arrangement that helps control the forward motion of the no-hands stroller 24. The stroller end of flexible connector 25 or the stroller mounted magnet (or other detachable mechanism) of magnets 35 is connected to one end of a swivel member 72 that pulls on a brake cable 74. A brake 75, such as a common bicycle caliper brake, is connected to the cable 74. Spring 73 acts to pull the swivel member 72 forward (to the left in FIG. 8) to disengage the brake 75.

If the gravity of downhill operation or other factors tends to move the no-hands stroller 24 faster than the running user 21 is running, the flexible member 25 will pull on the swivel member 72. If this pulling force is sufficient to overcome the force of the spring 73, the swivel member 72 will swivel and engage the brake 75. This will slow the no-hands stroller 24 to a speed equal to that of the running user 21. It will be well understood by those skilled in the art that many other mechanisms can be employed to achieve similar braking action without departing from the scope of the invention.

Figure 9:
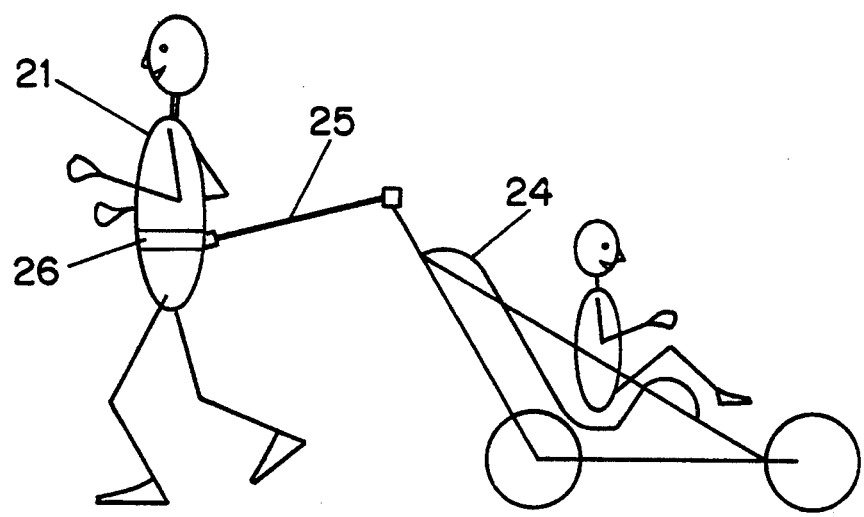
FIG. 9 is a schematic illustration of an alternative embodiment where the stroller is behind the runner.

FIG. 9 shows an alternative embodiment wherein the no-hands stroller 24 is attached behind the running user 21 and is pulled along. Safety features equivalent to those of the push version of the no-hands stroller 24 may be employed in this pull version. For example, in the braking mechanism of FIG. 8, the brake 75 of the pull version of the no-hands stroller 24 could be made to engage if the swivel member 72 was pulled too close to the no-hands stroller 24 indicating that, perhaps, the stroller 24 is gaining ground on the running user on a downgrade or the running user has fallen. The disconnection safety feature of the push version described above and depicted in FIG. 7 would operate in the same manner in the pull version if, for example, the stroller 24 was somehow stopped or slowed down while the running user 21 continued to run.

It will be appreciated by those skilled in the art that changes and modifications of an obvious nature could be made to the disclosed embodiment without deviating from the spirit of the invention. Therefore, the above description and illustration should not be taken as limiting the scope of the invention which is defined by the appended claims.

I claim:

1. An improved baby stroller for pushing a baby without the use of one's hands or arms wherein the stroller has a front end and a rear end at least two wheels rotatably mounted to the bottom of a stroller frame, wherein the frame supports a seat such that the baby faces forwardly in the stroller, the stroller further comprising:
   an elongate connector having a first end and a second end, the connector comprising a rigid material and a means for flexing substantially in the vertical plane at each end;
   means for attaching the first end of the connector to person; and
   means for attaching the second end of the connector to the rear end of the stroller.

2. The apparatus of claim 1 wherein the means for attaching the first end of the connector to the person comprises a belt worn around the person's waist, the belt secured to the first end of the connector.

3. The apparatus of claim 1 wherein the means for attaching the second end of the connector to the rear end of the stroller comprises a releasable connection which will cease to attach the second end of the connector to the stroller if opposite forces caused by the speed of the stroller suddenly exceeding the speed of the person act to pull the connector away from the stroller.

4. The apparatus of claim 3 further comprising a means for continuing to connect the person to the stroller in the event the means for attaching the second end of the connector to the stroller ceases to attach the connector to the stroller.

5. The apparatus of claim 4 wherein the means for continuing to connect the runner to the stroller comprises a cable having a first and second end, the first end attached to the second end of the connector and the second end attached to the stroller.

6. The apparatus of claim 4 wherein the means for continuing to connect the person to the stroller comprises a cable having a first and second end, the first end attached to the person and the second end attached to the stroller.

7. The apparatus of claim 1 wherein the means for attaching the second end of the connector to the rear end of the stroller comprises a first magnet and a second magnet, the first magnet being affixed to the second end of the connector and magnetically attached to the second magnet which in turn is affixed to the stroller.

8. The apparatus of claim 7 further comprising a cable having a first and second end, the first end attached to the first magnet and the second end attached to the stroller.

9. The apparatus of claim 7 further comprising a cable having a first and second end, the first end attached to the person and the second end attached to the stroller.

10. .The apparatus of claim 1 wherein the means for flexing comprises two swivel assemblies, one disposed at each end of the rigid material, each of the swivel assemblies enabling the connector to flex at the swivel assembly substantially in only one plane, the plane being vertical, and the swivel assemblies oriented at each end to allow the connector to flex in the same vertical plane as both swivel assemblies.

11. The apparatus of claim 1 wherein the length of the elongate connector is between six inches and four feet.

12. The apparatus of claim 1 wherein the length of the elongate connector is about two feet.

13. The apparatus of claim 1 further comprising a means for automatically braking the stroller if the stroller is moving faster than the running user.

14. The apparatus of claim 13 wherein said means for automatically braking the stroller comprises:
a swivel member having a first end and a second end interposed between the stroller and the means for attaching the second end of the stroller, the first end of the swivel member being attached to the stroller such that the swivel member swings away from and toward the stroller, the second end of the swivel member being attached to the means for attaching the elongate connector to the stroller, and the second end of the swivel member being attached to the stroller by a spring which exerts a force which causes the swivel member to swing toward the stroller;
a brake mounted on one of the wheels of the stroller;
a brake cable having a first end and a second end, the first end connected to the brake and the second end connected to the swivel member such that the brake is engaged when the swivel member swings away from the stroller and is disengaged when the swivel member swings toward the stroller.

15. The apparatus of claim 1 wherein the elongate connector further comprises a means for providing flexibility of the connector in the direction of the length of the connector.

16. The apparatus of claim 15 wherein the rigid material comprises two separate sections and the means for providing flexibility comprises a coil spring in a cylindrical housing, interposed between the two sections of the rigid material one section of the rigid material being connected to one end of the coil spring within the housing at one end of the housing and the other section of the rigid material being connected to the other end of the housing such that the means for providing flexibility acts as a shock absorber.

* * * * *

UNITED STATES PATENT AND TRADEMARK OFFICE
CERTIFICATE OF CORRECTION

PATENT NO. : 5,375,861

DATED : December 27, 1994

INVENTOR(S) : Gifford

It is certified that error appears in the above-indentified patent and that said Letters Patent is hereby corrected as shown below:

<u>Col. 3, line 32</u>, "De employed" should read --be employed--.

Signed and Sealed this

Twenty-third Day of May, 1995

Attest:

BRUCE LEHMAN

*Attesting Officer*     *Commissioner of Patents and Trademarks*